United States Patent [19]

Chabardes et al.

[11] 4,038,323

[45] July 26, 1977

[54] ALKENYL ARYL SULFONES

[75] Inventors: Pierre Chabardes, Lyon; Marc Julia, Paris, both of France

[73] Assignee: Rhone-Poulenc S.A., Paris, France

[21] Appl. No.: 401,033

[22] Filed: Sept. 26, 1973

Related U.S. Application Data

[62] Division of Ser. No. 254,103, May 17, 1972, Pat. No. 3,803,252.

[30] Foreign Application Priority Data

May 19, 1971 France .................................. 71.18168

[51] Int. Cl.² .......................................... C07C 147/08
[52] U.S. Cl. .............................................. 260/607 AR
[58] Field of Search ................................. 260/607 AR

[56] References Cited

U.S. PATENT DOCUMENTS 3,655,620  4/1972  Julia .................................. 260/607 A Primary Examiner—Delbert R. Phillips
Attorney, Agent, or Firm—Stevens, Davis, Miller & Mosher

[57] ABSTRACT

Carotene compounds e.g. β-carotene, are prepared by reacting a sulphone Ret—SO$_2$—R, in which Ret represents retinyl or substituted retinyl and R represents a hydrocarbon radical, in the presence of an alkaline reagent with an ester Ret-X, in which X represents an acid residue, and then desulphonating the product, for example with an alkaline reagent.

3 Claims, No Drawings

ALKENYL ARYL SULFONES

This is a division of application Ser. No. 254,103, filed May 17, 1972, now U.S. Pat. No. 3,803,252.

The present invention relates to the preparation of carotenoid compounds from compounds of the retinene family, and in particular to the preparation of β-carotene from derivatives of retinol, more usually called vitamin A.

Some of the numerous methods of synthesis which have been proposed for the preparation of β-carotene and its derivatives and homologues involve reacting two derivatives of retinene to obtain directly a compound comprising the 40 carbon structure of the carotenoids. Thus it has been proposed to react a retinyl phosphonate with retinaldehyde in the presence of an alkali metal alcoholate (Journal of Organic Chemistry, 1969, 34, 559), but the preparation of the retinyl phosphonate comprises many stages including a hydrogenation stage which must be selective. It has also been proposed to react retinaldehyde with a retinyl phosphylide (Angewandte Chemie, 1960, 72, 914–15), it being possible to prepare the latter compound itself from a vitamin A alcohol; in this case two different starting materials, retinol and its aldehyde, are used which is a disadvantage. Furthermore, the preparation of the retinyl phosphonate or the retinyl phosphylide involves the use of a phosphite ester or a phosphine respectively. Now, during the condensation of these compounds with retinaldehyde, an orthophosphoric ester or a phosphine oxide respectively is liberated, and these must be converted into a phosphite ester or a phosphine respectively in order that they can be re-used.

A process for the synthesis of carotenoid compounds has now been found which can be carried out in a few stages from reactants which are simple to prepare, and in which the secondary products which are produced during the reaction can be re-used directly for the preparation of the starting material.

The process of the present invention comprises reacting a retinyl-sulphone of the formula Ret—SO$_2$—R in which Ret represents retinyl or substituted retinyl and R represents alkyl, aryl, alkylaryl or aralkyl with a compound of the formula RetX in which Ret is as defined above and X represents an inorganic or organic anion, i.e. the residue of an inorganic or organic acid after removal of acidic hydrogen in the presence of a basic reagent, and then desulphonating the new sulphone obtained as intermediate.

The sulphones involved in this process are new compounds which can be represented by the formula:

(I)

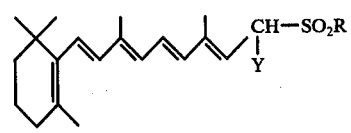

in which R is as hereinbefore defined and Y represents a hydrogen atom or a retinyl radical. This formula may represent sterically pure products, or mixtures of different isomers.

The unsubstituted sulphones used as starting materials have the formula (I) in which Y represents a hydrogen atom; they are called herein retinyl-sulphones. They can be prepared by known methods for the preparation of sulphones. A particularly advantageous method consists of reacting an alkali metal sulphinate of the formula RSO$_2$M, in which R represents alkyl, aryl, alkylaryl or aralkyl, preferably phenyl or tolyl, and M represents an alkali metal, with retinol or a retinol ester of an inorganic or organic acid, such as retinyl chloride or bromide, or retinyl formate or acetate. They can also be prepared by reacting a sulphinic acid RSO$_2$H with retinol, it being possible to from this acid in situ, if required, from a metal sulphinate in an acid medium. Finally, these sulphones can also be prepared from 3,7-dimethyl-2',6α,6'-trimethyl-9-cyclohexenyl-1,4,6,8-nonatetraen-3-ol, which is a vinyl carbinol isomeric with retinol and called 3-retinol, and easier to obtain than the latter. The reaction of the sulphinates with the 3-retinol is accompanied by a rearrangement into 1-retinol and the desired retinyl-sulphone is obtained in good yields.

The compounds of the formula RetX defined above can be prepared by reacting inorganic or organic acids with 1-retinol or 3-retinol or their derivatives under the usual conditions for the preparation of inorganic or organic esters. In order to obtain them for example, a hydracid such as hydrochloric acid or hydrobromic acid or a carboxylic acid such as formic acid or acetic acid can be reacted with the retinol. Retinyl halides may be made by reacting, at a low temperature, 1-retinol or 3-retinol with a halogenating reagent such as, for example, a phosphorus halide or a thionyl halide. Whether it is an ester of inorganic or an organic acid, this compound RetX can be the same as that used for the preparation of the retinyl-sulphone with which the ester reacts later. There is thus the possibility of preparing from the same starting material, 1-retinol or 3-retinol, the two reactants employed in the new process, and this constituted a considerable advantage.

The reaction of the retinyl-sulphone with the retinyl ester is carried out in the presence of an inorganic or organic basic reagent, the reactivity of which is sufficient to anionise the sulphone and thus promote the reaction, which can be shown diagrammatically as follows:

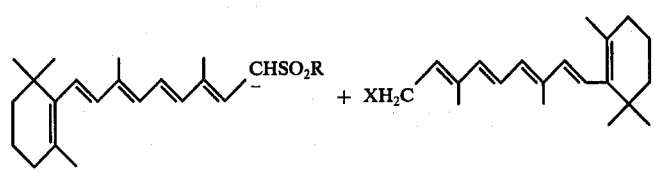

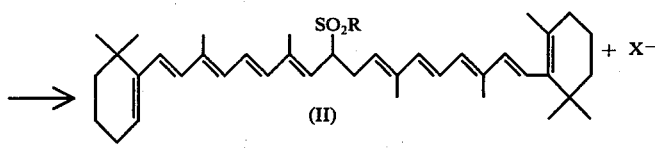

Suitably basic reagents include alkali metal alcoholates, hydrides and amides and organometallic compounds such as orgao-lithium, organo-zinc and organomagnesium compounds. The amount of alkaline reagent required is the stoichiometric amount based on the sulphone and the same applies to the amount of retinyl halide. Nevertheless, an excess of one or both of these reagents is not harmful. The reaction is carried out, preferably in an inert gas atmosphere, at temperatures which should not exceed ambient temperature and which are usually less than 0° C. To carry out the reaction, an organic, preferably anhydrous, solvent is used, such as an ether like diethyl ether, dioxane or tetrahydrofuran or a highly polar or non-polar solvent such as dimethylformamide, dimethylacetamide, dimethylsulphoxide, N-methylpyrrolidone hexamethylphosphoramide, benzene and toluene.

Since the retinyl halides are prepared at a low temperature, in solvents which can be the same as those used for their reaction with the retinyl-sulphone, a practical procedure consists of carrying out the latter reaction with the same solutions as were used in the preparation of these halides. The carotenoid sulphone (II), indicated in the above-mentioned equation and which corresponds to the general formula (I) in which Y represents the retinyl radical is thus obtained rapidly.

The desulphonation of the sulphone (II) to obtain the corresponding carotenoid compound is carried out with a basic reagent, for example, an alkali metal hydroxide. The amount of basic reagent required is substantially eqimolar with the sulphone treated, and, although it is not harmful, an excess of this reagent is not necessary. The desulphenation can be carried out in a solvent such as an alcohol, a hydrocarbon or a highly polar solvent. However, as the carotenoid sulphone does not have to be isolated before it is desulphonated, the treatment with the alkaline reagent can be carried out in the preparation mdium of this sulphone.

No matter what procedure is chosen, the desulphonation may be carried out under the usual conditions and can, in certain cases, be accelerated by heating. Temperatures in the range −30° C to +80° C. can be used. It yields the carotenoid compounds sought, and at the same time liberates the sulphinic acid $RSO_2H$ which is immediately converted by the basic reagent into a sale which can be re-used for the preparation of the retinyl-sulphone used as starting material. This ability to regenerate the sulphinate used for the preparation of the retinyl sulphone is one of the advantages of the process of the invention.

It is possible by the new process to prepare β-carotene from derivatives of retinene as well as derivatives of β-carotene carrying substituents on the cyclohexenyl ring. Thus canthaxanthine, isozeaxanthine and the compounds of this type can be prepared from oxoretinene, 4-hydroxy-retinene or another derivative after having taken care to protect the substituent group if it is liable to react during the process.

The Examples which follow illustrate the invention.

EXAMPLE 1

1. Preparation of retinyl-phenyl-sulphone

3-Retinol or 2′,6′,6′-trimethyl-9-cyclohexenyl-3,7-dimethyl-1,4,6,8-nonatetraene-3-ol (1.43 g. = 5 × 10$^{-3}$ mol) dissolved in diethyl ether (3 cc.) is added to a 100 cc. flask containing acetic acid (30 cc.) and sodium phenylsulphinate (1.06 g. = 6.5 × 10$^{-3}$ mol). The reaction mixture is left to stand for several hours, poured into water (60 cc.) and then extracted with diethyl ether (4 × 10 cc.). The combined ether layers are washed with a saturated aqueous solution of sodium bicarbonate (3 × 15 cc.) and dried over magnesium sulphate. Evaporation of the ether leaves a viscous product (5.05 g.) in which retinyl-phenyl-sulphone of the formula:

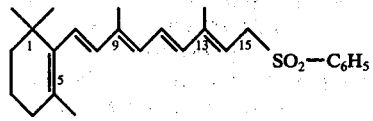

is identified by infra-red spectroscopy and nuclear magnetic resonance. I.R.: characteristic sulphone peak at 1150–1310 cm$^{-1}$ N.R.R. in carbon tetrachloride (internal standard tetramethylsilane); multiplet from 2τ to 2.6τ ($C_6H_5$—$SO_2$ at 15); doublet centered on 6.2τ (—$CH_2$—$SO_2$— at 14 ); triplet centered on 4.6τ (=CH—$CH_2$—); triplet centered on 9τ [($CH_3$)$_2$— C< at 1]; 8.5τ — 8.3τ and 8.1τ ($CH_3$— at 5, at 9 and at 13).

2. Preparation of retinyl bromide.

A solution of 3-retinol (1.43 g.) dissolved in diethyl ether (3 cc.) an pyridine (0.025 g.) is placed in a three-necked 50 cc. flask, purged with nitrogen. The mixture is cooled to −30° C. and a solution of phosphorus tribromide (0.45 g. = 1.67. 10$^{-3}$ mol) in diethyl ether (4 cc.) is run in. The mixture is then kept at this temperature for 3 hours with stirring. The reaction mixture containing the retinyl bromide is maintained at −30° C until it is used.

3. Preparation of the carotenoid phenylsulphone.

Retinyl-phenyl-sulphone (4.1 g.), prepared as described above is introduced into a three-necked 50 cc. flask, purged with nitrogen, containing potassium t-butylate (1.87 g.) suspended in anhydrous tetrahydrofuran (3 cc.) and maintained at 14° C. The mixture is then cooled to −30° C, and the solution of retinyl bromide at −30° C is run in over a period of 10 minutes. Stirring is continued for 1 hour 30 minutes, and the reaction mixture is then left to stand for several hours at +5° to +10° C. The mixture is poured into ice-cold water (50 cc.) and extracted with diethyl ether (6 × 40 cc.). The combined ether layers are dried over magnesium sulphate and then concentrated in vacuo. A solid orange product (3.6 g.) is obtained, identified by infra-red spectroscopy and nuclear magnetic resonance as being the sulphone of the formula:

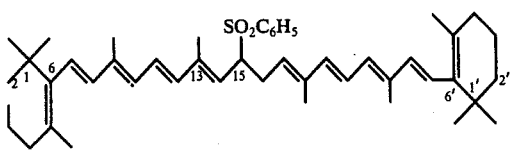

I.R.: characteristic sulphone peak 1150–1310 cm$^{-1}$. N.M.R. in carbon tetrachloride (internal standard tetramethysilane): multiplet from 2τ to 2.6τ ($C_6H_5$—$SO_2$— at 15); 6.3τ and 4.6τ

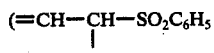

at 14–15); triplet centered on 9τ [$(CH_3)_2C<$ at 1 and 1']; 8.5τ ($CH_3$— at 5 and 5'); 8.3τ ($CH_3$— at 9 and 9'); 8.1τ ($CH_3$— at 13 and 13').

4. Preparation of β-carotene

The sulphone prepared as described in paragraph (3) above (1.03 g.), pellets of potassium hydroxide (0.23 g.) and ethyl alcohol (3 cc.) are placed in a flask of 50 cc. capacity equipped with a reflux condenser and a magnetic stirrer. The mixture is heated under reflux for 2 hours, cooled, poured into water, and acidified to a pH of 4 with N sulphuric acid. The solution is extracted with diethyl ether (5 × 20 cc.), and the combined ether layers are then washed with water (20 cc.), dried over magnesium sulphate, and evaporated in vacuo. A product (1.05 g.) in the form of a red paste, is thus obtained which is recrystallised from a mixture of dichloroethane and methanol. The purified β-carotene has a melting point of 188° C (KOFLER bench), and, in ultra-violet spectroscopy, dissolved in ethanol, shows an absorption maximum $E_1^{1\%}$ cm equal to 1725 at 450 nm.

EXAMPLE 2

Preparation of retinyl-phenyl-sulphone from retinyl acetate (the acetate of Vitamin A).

Sodium phenyl-sulphinate (1.06 g.) and ethanol (30 cc.) are placed, under argon, in a three-necked 50 cc. flask equipped with a magnetic stirrer an a reflux condenser. Retinyl acetate (1.39 g = 4.25 × 10$^{-3}$ mol) dissolved in ethanol (10 cc.) s run in, and the mixture is then heated under reflux for 11 hours 30 minutes. The ethanol is evaporated in vacuo and the residue is taken up in water (30 cc.) and diethyl ether (20 cc.). After decanting and washing the aqueous layer with diethyl ether, the combined ether fractions are dried over magnesium sulphate, filtered and evaporated to dryness. A dark yellow product (2.05 g.) is thus obtained, containing retinyl-phenyl-sulphone (1.64 g.), characterised as in Example 1, and unconverted vitamin A acetate (0.04 g.). The yield relative to the vitamin A acetate consumed is 97%.

EXAMPLE 3

1. Preparation of retinyl-phenyl-sulphone.

As in Example 1, a solution of sodium phenylsulphinate (8.53 g.) in acetic acid (180 cc.) is reacted with -retinol (11.44 g.). The mixture is left to stand for 16 hours at ambient temperature under a nitrogen atmosphere. Acetic acid (150 cc.) is distilled off and the reaction mixture is worked up as in Example 1. The sulphone (14.6 g.), identical to that in Example 1, is obtained. The yield based on the alcohol used is 89%.

2. Preparation of retinyl chloride.

3-Retinol (11.44 g.), anhydrous diethyl ether (40 cc.) and pyridine (0.2 cc.) are placed, under nitrogen, in a three-necked 250 cc flask. The mixture is cooled to −25° C and a solution of phosphorous trichloride (1.83 g.) in diethyl ether (15 cc.) is run is over a period of 7 minutes. The mixture is stirred for 4 hours at a temperature of −25° C. The reaction mixture, containing the retinyl chloride formed in this way, is used immediately in the crude form, in the following stage.

3. A solution of retinyl-phenyl-sulphone (14.55 g.) in diethyl ether (38 cc.) and tetrahydrofuran (5 cc.) is run, over a period of 2 minutes, into a suspension of potassium t-butylate (8.96 g.) in tetrahydrofuran (35 cc.). The mixture is cooled to −30° C and all of the retinyl chloride previously prepared is run in over a period of 12 minutes. The mixture is maintained at this temperature for 3 hours and the temperature is then allowed to rise to −10° C. The reaction mixture is poured onto a mixture of ice (200 g.) and diethyl ether (100 cc.). The ether layer is decanted and the aqueous layer is extracted with more ether (3 × 100 cc. and 2 × 50 cc.). The combined ether layers are washed with water, dried and concentrated in vacuo. The same carotenoid phenyl sulphone (32.6 g.) as that of Example 1 paragraph (3) is thus obtained, and 70% pure. The yield is 94.8% based on the retinyl-phenyl-sulphone.

4. The carotenoid phenyl sulphone obtained as in paragraph (3) is treated with ethanol solution of potassium hydroxide (7.5 cc. containing 0.225 g. of hydroxide) under the same conditions as in Example 1. The acidification, to pH 4, is carried out with a solution of 2N sulphuric acid. After extraction with diethyl ether, drying and evaporation of ether, β-carotone is obtained which shows, in U.V. spectroscopy, dissolved in ethanol, an absorption maximum $E_1^{1\%}$ cm equal to 850 at 450 nm. The yield is 71.9% based on the carotenoid phenyl sulphone.

We claim:

1. A retinyl-sulphone of the formula:

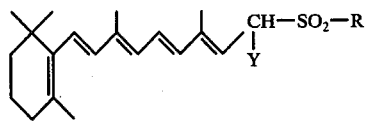

in which Y is hydrogen or retinyl, and R is alkyl, aryl, alkylaryl, or aralkyl.

2. The compound claimed in claim 1 in which R is phenyl and Y is hydrogen.

3. The compound claimed in claim 1 in which R is phenyl and Y is retinyl.

* * * * *